United States Patent
Watanabe et al.

(10) Patent No.: US 11,781,228 B2
(45) Date of Patent: Oct. 10, 2023

(54) METHOD FOR MANUFACTURING SULFURIC ACID SOLUTION AND ELECTROLYZER USED THEREOF

(71) Applicant: SUMITOMO METAL MINING CO., LTD., Tokyo (JP)

(72) Inventors: Hiroto Watanabe, Niihama (JP); Itsumi Matsuoka, Niihama (JP); Yusuke Senba, Niihama (JP); Hiroshi Kobayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 306 days.

(21) Appl. No.: 16/965,423

(22) PCT Filed: Apr. 19, 2019

(86) PCT No.: PCT/JP2019/016742
§ 371 (c)(1),
(2) Date: Jul. 28, 2020

(87) PCT Pub. No.: WO2019/220858
PCT Pub. Date: Nov. 21, 2019

(65) Prior Publication Data
US 2021/0230755 A1    Jul. 29, 2021

(30) Foreign Application Priority Data

May 16, 2018 (JP) ................................ 2018-094222
Aug. 9, 2018 (JP) ................................ 2018-149872
Feb. 18, 2019 (JP) ................................ 2019-026645

(51) Int. Cl.
*C25B 1/22*      (2006.01)
*C25B 1/50*      (2021.01)
(Continued)

(52) U.S. Cl.
CPC ............... *C25B 1/22* (2013.01); *C01G 51/10* (2013.01); *C01G 53/10* (2013.01); *C25B 1/50* (2021.01);
(Continued)

(58) Field of Classification Search
CPC .... C25F 3/02; C25B 1/22; C25C 1/08; H01M 2300/0011
See application file for complete search history.

(56) References Cited

U.S. PATENT DOCUMENTS 2,045,212 A * 6/1936 Bosqui ...................... C25C 1/08
                                                205/587
4,775,452 A * 10/1988 Kuninaga ............. C22B 11/042
                                                205/348
(Continued)

FOREIGN PATENT DOCUMENTS

CA           1214748 A      12/1986
CN         104213149 B      2/2017
(Continued)

OTHER PUBLICATIONS

Machine translation of RU2152460C1 of Alekseev et al (Year: 2000).*

(Continued)

*Primary Examiner* — Brian W Cohen
(74) *Attorney, Agent, or Firm* — Kratz, Quintos & Hanson, LLP

(57) ABSTRACT

A method for manufacturing a sulfuric acid solution includes supplying a chloride ion-containing sulfuric acid solution as an initial electrolyte in an electrolyzer inside of which is divided into an anode chamber and a cathode chamber by a diaphragm; and subsequently taking out a metal dissolved electrolyte in which a metal constituting the anode is dis-
(Continued)

solved from the anode chamber while supplying a current to an anode and a cathode disposed in the electrolyzer.

6 Claims, 2 Drawing Sheets

(51) Int. Cl.
    *C25F 3/02*     (2006.01)
    *C25C 1/08*     (2006.01)
    *C01G 51/10*     (2006.01)
    *C01G 53/10*     (2006.01)
    *C25B 9/00*     (2021.01)
    *C25B 13/02*     (2006.01)
    *C25B 15/02*     (2021.01)
    *C25B 15/08*     (2006.01)
    *H01M 4/525*     (2010.01)
    *H01M 4/02*     (2006.01)

(52) U.S. Cl.
    CPC .............. *C25B 9/00* (2013.01); *C25B 13/02* (2013.01); *C25B 15/02* (2013.01); *C25B 15/08* (2013.01); *C25C 1/08* (2013.01); *C25F 3/02* (2013.01); *H01M 4/525* (2013.01); *C01P 2006/40* (2013.01); *H01M 2004/028* (2013.01)

(56) References Cited

U.S. PATENT DOCUMENTS

| | | | |
|---|---|---|---|
| 4,877,498 A | 10/1989 | Fukuda | |
| 5,423,957 A * | 6/1995 | Herrmann | C25B 1/00 205/622 |
| 7,022,216 B2 * | 4/2006 | Taylor | B23H 3/00 257/E21.309 |
| 8,268,232 B2 * | 9/2012 | Kim | C22B 3/02 266/168 |
| 2011/0253552 A1 * | 10/2011 | Hsu | C22B 11/042 205/587 |
| 2016/0215402 A1 | 7/2016 | Takahashi | |

FOREIGN PATENT DOCUMENTS

| | | |
|---|---|---|
| EP | 2528704 A1 | 12/2012 |
| JP | S59-083785 A | 5/1984 |
| JP | S59-229490 A | 12/1984 |
| JP | S60-005890 A | 1/1985 |
| JP | S62-256975 A | 11/1987 |
| JP | 2002-320969 A | 11/2002 |
| JP | 2008-127627 A | 6/2008 |
| JP | 2009-167451 A | 7/2009 |
| JP | 2009-203487 A | 9/2009 |
| JP | 2011-225963 A | 11/2011 |
| JP | 2014-088585 A | 5/2014 |
| JP | 2015-140465 A | 8/2015 |
| RU | 2152460 C1 * | 7/2000 |
| SU | 1397541 A1 | 6/1988 |
| WO | WO-2010089452 A1 * | 8/2010 ............ C25C 1/06 |

OTHER PUBLICATIONS

International Search Report for International Application No. PCT/JP2019/016742 dated Jun. 18, 2019 (3 sheets, 2 sheets translation, 5 sheets total).

Written Opinion of the International Searching Authority for International Application No. PCT/JP2019/016742 dated Jun. 18, 2019 (5 sheets).

D. Sazou, et al.; "Polarization behaviour of a cobalt rotating disc electrode in sulphuric acid solutions in the absence and presence of chloride ions"; Journal of Electroanalytical Chemistry and Interfacial Electrochemistry; vol. 304; 1991; pp. 171-185 (15 pages).

Database WPI; Thompson Scientific; London; Hungarian Patent AN 1988-142286 (machine translation, 2 sheets total).

* cited by examiner

METHOD FOR MANUFACTURING SULFURIC ACID SOLUTION AND ELECTROLYZER USED THEREOF

TECHNICAL FIELD

The present invention relates to a method for manufacturing a sulfuric acid solution, and to an electrolyzer used in this manufacturing method. Further specifically, the present invention relates to a method for manufacturing a metal ion-containing sulfuric acid solution in which a metal, such as nickel or cobalt, is dissolved in sulfuric acid, and to an electrolyzer used in this manufacturing method.

BACKGROUND ART

Metals, such as nickel or cobalt, are valuable metal used as a material of plating or an alloy. In recent years, for an application besides the plating or the alloy, the metal, such as nickel or cobalt, has been increasingly used as an electrode material, such as a positive electrode material of a secondary battery, such as a nickel-metal hydride battery or a lithium-ion battery. In this respect, the metal, such as nickel or cobalt, is often used as a solution in which they are dissolved, for example, a nickel ion-containing sulfuric acid solution in which the nickel is dissolved.

As one example, when the nickel is used as the above-described positive electrode material of the lithium-ion battery, there is a method that obtains the positive electrode material by neutralizing a nickel ion-containing water solution mixed in a predetermined proportion to form a metallic hydroxide referred to as a precursor, and next, mixing this precursor and a lithium compound and sintering the mixture, as a general method for manufacturing a positive electrode of a lithium-ion battery. Here, the above-described nickel ion-containing water solution is, specifically, a solution in which a nickel salt, such as a nickel sulfate or nickel chloride, is dissolved. When this solution is used in the above-described manufacturing method, it is necessary to reduce a halogen (chlorine) in the solution to a specification of the usage or less.

For example, the above-described nickel ion-containing sulfuric acid solution can be obtained by removing impurities in a purification process, such as a sedimentation separation or a solvent extraction, after leaching nickel ore, nickel sulfide as its intermediate product, or any other nickel containing compound, with sulfuric acid. However, when the above-described raw material is used, there lies a problem that a required quality cannot be stably maintained because the halogen, other impurities, or the like is irregularly mixed in a raw material or the purification process.

In contrast to this, as a method for stably maintaining the required quality, there is a method that obtains a nickel ion-containing sulfuric acid solution by dissolving metallic nickel in sulfuric acid. For the metallic nickel, a high-quality one with a nickel purity of 99.99% or more is easily available from market as, for example, an electric nickel. This electric nickel cut into a size of 2 to 5 cm square is further easily handled, thereby ensuring serving as a material of the precursor without requiring the above-described large-scaled purification process.

However, as the nickel is used in a corrosion-resistant alloy, such as a stainless steel, even though it is a cut product, the nickel is difficult to be dissolved only by immersing the metallic nickel in an acid, such as the sulfuric acid. In view of this, there are a few methods for accelerating the dissolution of the metallic nickel and causing a concentration of nickel ion to reach a predetermined concentration. For example, as a method for obtaining a nickel ion-containing sulfuric acid solution by dissolving the metallic nickel in the sulfuric acid, there is proposed a method that obtains a nickel ion-containing sulfuric acid solution by using nickel in powder form (nickel powder) or a briquette made by sintering the nickel powder and dissolving them in the sulfuric acid (Patent Document 1).

However, the nickel powder and the nickel briquette used in Patent Document 1 are difficult to be stably obtained since an amount of production is limited. From such circumstances, there is demanded a technique that dissolves the electric nickel in a plate shape or in a lump, which is distributed in market, in the sulfuric acid in a short time.

As a solution for this request, for example, there is an electrolytic method. That is, a method that dissolves a target metal in sulfuric acid by using a metal that is desired to be dissolved as an anode (positive electrode) and a sulfuric acid solution as an electrolyte, and applying a current between the anode and a cathode (negative electrode).

This method that uses the electrolytic method is disclosed in Patent Document 2. In this method, electrodes that use metal cobalt as a positive electrode material and platinum or a metal coated with platinum as a negative electrode material are immersed in an electrolyte having a sulfuric acid concentration of 0.5 to 7.0 mol/liter. A direct current is applied between the positive electrode and the negative electrode to generate a cobalt solution. In this respect, a cobalt sulfate crystal that is supersaturated and precipitated from this cobalt solution is fractionated, and this cobalt sulfate crystal is dissolved in water to obtain a cobalt sulfate solution. The method for manufacturing the cobalt sulfate solution undergoes such processes is provided.

Patent Document 1: JP-A-2004-067483
Patent Document 2: JP-A-2003-0%585

DISCLOSURE OF THE INVENTION

Problems to be Solved by the Invention

With a conventionally and generally known electrolytic method, when a metal, for example, nickel is dissolved in a sulfuric acid solution, in order to quickly dissolve a metallic nickel, it is preferred to perform an electrolysis by increasing an anode current density to approximately 1000 A/m$^2$ or higher. However, executing the electrolytic method with such a high current density causes a problem that a current hardly flows due to a formation of an oxide film on a surface of the metallic nickel of the anode and causing a passivation. When the electrolytic method is performed by decreasing the current density so as to suppress causing the passivation, there lies a problem that the dissolution is not accelerated, and an original purpose of accelerating the dissolution cannot be reached.

In particular, for a nickel ion-containing sulfuric acid solution required for manufacturing a positive electrode material of a battery, a solution having a high concentration, a nickel ion concentration of approximately 100 g/liter, is required. When the concentration of nickel ion in the electrolyte increases, there occurs a problem of a further easily caused passivation, and a problem that the nickel is deposited on the electrode in a cathode side to lower dissolution efficiency.

The present invention has been made in view of the above-described circumstances, and it is an objective of the present invention to provide a method for manufacturing a sulfuric acid solution that highly efficiently dissolves a metal with a high anode current density while suppressing a passivation in an electrolytic method, one of the methods that accelerates a dissolution of a metal with respect to a sulfuric acid solution, and an electrolyzer used in this manufacturing method.

Solutions to the Problems

A method for manufacturing a sulfuric acid solution according to a first invention includes an initial electrolyte supply step of supplying a chloride ion-containing sulfuric acid solution as an initial electrolyte in an electrolyzer inside of which is divided into an anode chamber and a cathode chamber by a diaphragm, and an electrolyte taking out step of supplying a current to an anode and a cathode disposed in the electrolyzer and subsequently taking out a metal dissolved electrolyte in which a metal constituting the anode is dissolved from the anode chamber.

A method for manufacturing a sulfuric acid solution according to a second invention is the first invention in which the metal constituting the anode contains at least any one of nickel and cobalt.

A method for manufacturing a sulfuric acid solution according to a third invention is the first invention or the second invention in which the chloride ion-containing sulfuric acid solution has a chloride ion concentration of 1 g/liter or more and 20 g/liter or less.

A method for manufacturing a sulfuric acid solution according to a fourth invention is any one of the first invention to the third invention in which the cathode chamber has a liquid surface maintained to be higher than a liquid surface of the anode chamber.

A method for manufacturing a sulfuric acid solution according to a fifth invention is any one of the first invention to the fourth invention in which, the electrolyte taking out step includes supplying the anode and the cathode with a pulse current that repeats a periodic application and interruption of the current.

A method for manufacturing a sulfuric acid solution according to a sixth invention is the fifth invention in which, in the periodic application and interruption of the current, a proportion of a current application time in one cycle of the periodic application and interruption of the current is 0.8 or more and less than 1.0.

An electrolyzer according to a seventh invention is an electrolyzer for dissolving a metal constituting an anode by supplying a current. The electrolyzer has an inside divided into an anode chamber and a cathode chamber by a diaphragm. The diaphragm includes a filter cloth having a water permeability of 0.01 liters $(m^2 \cdot s)$ or more and 0.5 liters/ $(m^2 \cdot s)$ or less.

An electrolyzer according to an eighth invention is the seventh invention further includes an outlet pipe with an opening for taking out an electrolyte inside the electrolyzer, and the opening is disposed below the anode.

Effects of the Invention

According to the first invention, in the method for manufacturing the sulfuric acid solution, the used electrolyzer is divided into the anode chamber and the cathode chamber by the diaphragm. Therefore, the metal dissolved in an anode side is inhibited from moving to a cathode side. The method comprises the electrolyte taking out step, that is, the step of supplying the current to the anode and the cathode and taking out the metal dissolved electrolyte from the anode chamber. Therefore, a sulfuric acid solution high in metal ion concentration is taken out from the anode chamber. In view of this, a value of a nickel ion concentration in the anode chamber is not increased, and therefore, a formation of a passivation in the anode side can be suppressed, thereby ensuring an efficient manufacturing of a high-quality sulfuric acid solution in which the metal is dissolved.

According to the second invention, the metal constituting the anode contains at least any one of the nickel or the cobalt. Therefore, the manufactured sulfuric acid solution can be used as a positive electrode of a secondary battery.

According to the third invention, when the chloride ion concentration in the sulfuric acid solution is 1 g/liter or more and 20 g/liter or less, the current density when the anode electrode is dissolved can be increased. Therefore, a sulfuric acid solution can be further efficiently manufactured.

According to the fourth invention, the liquid surface of the cathode chamber is maintained to be higher than the liquid surface of the anode chamber. Therefore, a flow of the liquid from the cathode chamber to the anode chamber is formed, thereby further inhibiting the metal ions from moving to the cathode chamber from the anode chamber.

According to the fifth invention, supplying the pulse current that repeats the periodic application and interruption of the current to the anode and the cathode in the electrolyte taking out step ensures a further suppressed passivation.

According to the sixth invention, the proportion of the current application time in one cycle of the application and interruption of the current being 0.8 or more and less than 1.0 ensures maintaining manufacturing efficiency of the sulfuric acid solution while suppressing the passivation.

According to the seventh invention, the electrolyzer has an inside divided into the anode chamber and the cathode chamber by the diaphragm, and the diaphragm is the filter cloth having the water permeability of 0.01 liters/$(m^2 \cdot s)$ or more and 0.5 liters/$(m^2 \cdot s)$ or less. Therefore, using this electrolysis layer ensures inhibiting the metal ions from flowing to the cathode chamber from the anode chamber, thereby ensuring obtaining a high-quality sulfuric acid solution with high efficiency.

According to the eighth invention, the opening of the outlet pipe for taking out the electrolyte inside the electrolyzer is disposed below the anode. Therefore, an electrolyte in which the metal ions that has a relatively large specific gravity are dissolved is efficiently taken out.

DESCRIPTION OF PREFERRED EMBODIMENTS

Next, an embodiment of the present invention will be described based on the drawings. However, the embodiment described below is to exemplarily describe a method for manufacturing a sulfuric acid solution and an electrolyzer 10 for embodying a technical idea of the present invention, and the present invention does not specify the method for manufacturing the sulfuric acid solution or the electrolyzer 10 as the following. Note that a size, a positional relationship, or the like of members illustrated in each drawing may be exaggerated for a clear explanation. Furthermore, an "electrolyte" in the description means a liquid used for conducting electricity inside the electrolyzer 10, and includes an "initial electrolyte" supplied to the electrolyzer 10 first and a "metal dissolved electrolyte" in which a metal is dissolved by performing an electrolysis. The "electrolyte" taken out from the electrolyzer 10 is a "sulfuric acid solution" manufactured in the manufacturing method of the present invention.

Figure 1:
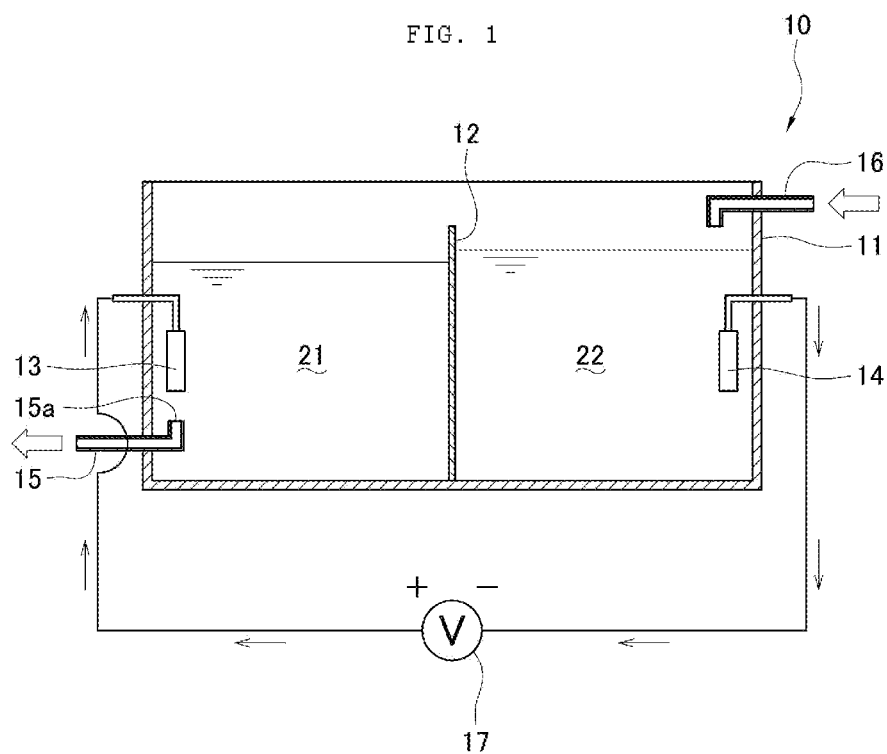
FIG. 1 is a cross-sectional view from a side surface direction of an electrolyzer used in a method for manufacturing a sulfuric acid solution according to the present invention.

FIG. 1 is a cross-sectional view from a side surface direction of the electrolyzer 10 used in the method for manufacturing the sulfuric acid solution according to the present invention. The method for manufacturing the sulfuric acid solution according to the present invention comprises an initial electrolyte supply step of supplying a chloride ion-containing sulfuric acid solution as an initial electrolyte to the electrolyzer 10 inside of which is divided into an anode chamber 21 and a cathode chamber 22 by a diaphragm 12, and an electrolyte taking out step of supplying a current to an anode 13 and a cathode 14 disposed in the electrolyzer 10, and taking out a metal dissolved electrolyte in which a metal constituting the anode 13 is dissolved from the anode chamber 21.

The metal that constitutes the anode 13 is preferred to contain at least any one of nickel and cobalt.

The sulfuric acid solution is preferred to have a chloride ion concentration of 1 g/liter or more and 20 g/liter or less.

A liquid surface of the cathode chamber 22 is preferred to be maintained higher than a liquid surface of the anode chamber 21.

In the electrolyte taking out step, a pulse current that repeats a periodic application and interruption of the current is preferred to be supplied to the anode 13 and the cathode 14.

In the periodic application and interruption of the current, a proportion of a current supply time in one cycle of the periodic application and interruption of the current is preferred to be 0.8 or more and less than 1.0.

The following describes the method for manufacturing the sulfuric acid solution used in the electrolyzer 10 after the electrolyzer 10 used in the method for manufacturing the sulfuric acid solution according to the present invention is described based on the drawings.

<Configuration of Electrolyzer 10>
(Electrolyzer Main Body 11)

An electrolyzer main body 11 has a configuration that can internally hold a sulfuric acid solution. A material that constitutes the electrolyzer main body 11 is a known material. The electrolyzer main body 11 comprises the anode chamber 21 and the cathode chamber 22 by using the diaphragm 12. The anode chamber 21 has the anode 13 located inside. The cathode chamber 22 has the cathode 14 located inside. Outside the electrolyzer main body 11, a direct-current power supply 17 connected to the anode 13 and the cathode 14 is disposed. Note that, in FIG. 1, a line connected to the anode 13 or the cathode 14 from the direct-current power supply 17 represents an electric wire, and the arrows along this line indicate a direction of a current.

Since the electrolyzer 10 to be used is divided into the anode chamber 21 and the cathode chamber 22 by the diaphragm 12, the metal dissolved in a side of the anode 13 can be inhibited from moving to aside of the cathode 14.
(Anode 13)

The anode 13 used for the electrolyzer 10 has a plurality of configurations. For example, when an acidic solution of nickel is attempted to be obtained, plate-shaped metallic nickel (electric nickel) that has been industrially electrolytic refined or electrowon is applicable as a first configuration of the anode 13. One that has metallic nickel cut into small pieces being filled in a basket made of a material insoluble in acid, such as titanium, is applicable as a second configuration. In the case of the second configuration, while it is necessary to be replaced before all of it entirely dissolves, and cutting the metal costs money and labor, the dissolution can be efficiently performed without any waste. In the case of the first configuration, it is necessary to replace the whole anode after the dissolution is terminated. The replacement is performed when a predetermined size is reached. The metallic nickel that has become smaller than the predetermined size can be used for a two-phase dissolution method by being filled into the basket of the second configuration and dissolved.
(Cathode 14)

For the cathode 14, a plate-shaped metal, such as titanium, stainless steel, nickel, cobalt, and platinum, is preferably used. One that has a structure in which the above-described nickel, cobalt, or the like is plated on a surface of aluminum, iron, or the like can also be used.
(Diaphragm 12)

The diaphragm 12 divides inside a tank of the electrolyzer main body 11 into the anode chamber 21 and the cathode chamber 22. The diaphragm 12 inhibits a liquid or ions from passing through. Specifically as the diaphragm 12, a neutral membrane, an anion exchange membrane, a cation exchange membrane, or the like can be used besides a filter cloth.

As the diaphragm 12, the filter cloth is preferably used. Specifically as the filter cloth, for example, product numbers P89C, TA72, P91C, and P26-2 manufactured by Shikishima Canvas Co., Ltd. is preferably used. Note that respective water permeabilities (liter/(m$^2$·s)) of these products are 0.05, 0.1, 0.3, and 1. The filter cloth is preferable in that it is relatively easy to handle.

The filter cloth with a small value of water permeability is preferred. For example, when a pressure of 200 mmH$_2$O at 25° C. is applied, a water permeability per unit area and unit time (s: second) is preferred to be 0.5 liters/(m$^2$·s) or less, and is further preferred to be 0.3 liters/(m$^2$·s) or less. This is because, when the water permeability per unit area and unit time is greater than 0.5 liters/(m$^2$·s), the liquid easily diffuses and a function as the diaphragm 12 is insufficient.

When the diaphragm 12 is a filter cloth having a water permeability of 0.5 liters/(m$^2$·s) or less, the metal ions can be inhibited from moving to the cathode chamber 22 from the anode chamber 21, and the metal ions can be taken out from the anode chamber 21 without any waste, thereby ensuring a further efficient manufacturing of a sulfuric acid solution.

The lower limit of the water permeability of the filter cloth is set such that the liquid does not overflow from the cathode chamber 22. Specifically, it is preferred to be 0.01 liters/(m$^2$·s) or more. The lower limit of the filter cloth being 0.01 liters/(m$^2$·s) causes the liquid of the same amount as the amount of replenished sulfuric acid to move to the anode chamber 21 from the cathode chamber 22 through the filter cloth, thereby reducing a mixture of the liquids due to the diffusion.

As the diaphragm 12, it is possible to use the neutral membrane. The neutral membrane is one that is provided with fine holes on a polymer membrane, and has a property of allowing ions to transmit but hardly allowing water to transmit. The neutral membrane has no ion polarity selectivity. Specifically, as the neutral membrane, model Y-920 IT by Yuasa Membrane Systems Co., Ltd. is a diaphragm excellent in chemical resistance and having low resistance, and is applicable.

As the diaphragm 12, it is also possible to use the anion exchange membrane. The anion exchange membrane has a fixed positive charge-exchange group, and therefore, has a property where cations are repulsed and cannot pass through and only anions are allowed to pass through. Using the anion exchange membrane keeps dissolved nickel ions (cations) in the anode chamber 21 and causes only anions (mainly sulfuric acid ions) to freely move, thereby ensuring obtaining a highly concentrated nickel ion sulfuric acid solution in the anode chamber 21. The anion exchange membrane is required to have properties, such as having large current density, small membrane resistance and a small voltage drop, large transport number, no scale deposition inside the membrane, high mechanical strength, and being thermally and chemically stable. When the current density sufficiently larger than the current density to dissolve the metal of the anode cannot be obtained, productivity depends on the current density of the anion exchange membrane. When the membrane resistance increases, the voltage drop increases, and the tank voltage increases, thereby causing an increased electricity cost. When the scales are deposited inside the membrane, or when the mechanical strength, or thermal or chemical stability is insufficient, the durability deteriorates, and the anion exchange membrane is frequently replaced. Specifically, as the anion exchange membrane, product name: NEOSEPTA AHA by ASTOM Corporation is applicable.

As the diaphragm 12, it is possible to use the cation exchange membrane. The cation exchange membrane has a fixed negative charge-exchange group, and therefore, anions are repulsed and cannot be passed through and only cations can be passed through. While the cation exchange membrane has no valence selectivity, a difference between mobilities of a hydrogen ion and a nickel ion can be used to obtain a highly concentrated nickel ion sulfuric acid solution in the anode chamber 21. The hydrogen ions do not move alone, but can move by giving and receiving of the hydrogen ions with oxonium ions around, and therefore, has a feature of large mobility compared with other ions. The cation exchange membrane is also required to have properties similar to that of the above-described anion exchange membrane. Specifically, as the cation exchange membrane, product name: Nafion N324 by DuPont de Nemours, Inc. is applicable.

Furthermore, among the cation exchange membranes, as a monovalent selective cation exchange membrane, there is one that can inhibit divalent ions from transmitting through by forming a thin layer that has a positive electric charge on the membrane surface and by a difference between a repulsion force between this charge layer and monovalent cation and a repulsion force between this charge layer and divalent cation. When this monovalent selective cation exchange membrane is used, the hydrogen ions (the monovalent cations) can freely move while most of the dissolved nickel ions (the divalent cations) are kept in the anode chamber 21, thereby ensuring obtaining a highly concentrated nickel ion sulfuric acid solution in the anode chamber 21. As a specific monovalent selective cation exchange membrane, product name: Selemion HSF by AGC Inc. having a transport number of 0.92 or more or product name: NEOSEPTA CIMS by ASTOM Corporation having a transport number of 0.96 or more is applicable.

(Outlet Pipe 15, Supply Pipe 16)

In the anode chamber 21 of the electrolyzer main body 11, an outlet pipe 15 for taking out the sulfuric acid solution from the anode chamber 21 is disposed. In the cathode chamber 22 of the electrolyzer main body 11, a supply pipe 16 for supplying new sulfuric acid or sulfuric acid solution to the cathode chamber 22 is disposed.

The nickel ion and the cobalt ion have a heavy specific gravity compared with that of water, a concentration of nickel and the like is high in a deep portion of the anode chamber 21 in association with the current application. Therefore, collecting the sulfuric acid solution from a deeper portion in the anode chamber 21, that is, an opening 15a of the outlet pipe 15 being disposed below the anode 13 in the anode chamber 21 ensures collecting the sulfuric acid solution having a high concentration of nickel and the like.

The opening 15a of the outlet pipe 15 being disposed below the anode 13 ensures collecting a sulfuric acid solution having a nickel concentration of 100 g/liter by collecting the sulfuric acid solution from the deep portion of the anode chamber 21, even though the nickel concentration near the surface of the anode 13 is thinner than 100 g/liter. This ensures suppressing the passivation of the nickel on the surface of the anode 13.

While it is preferred that a predetermined space is provided below the anode 13, when the space becomes excessively large, the volume of the electrolyzer 10 increases to increase a facility cost. Therefore, a rough indication of the depth to the bottom of the anode chamber 21 of the electrolyzer main body 11 from a lower end of the anode 13 is preferred to be 10% or more of a height of a liquid surface in the anode chamber 21.

Disposing the supply pipe 16 that replenishes new sulfuric acid and the like into the cathode chamber 22 and disposing the outlet pipe 15 that can collect the sulfuric acid nickel solution having the same amount as the replenished amount from the anode chamber 21 maintain a balance of liquid amount inside the tank of the electrolyzer 10.

The sulfuric acid being replenished in the cathode chamber 22 and the presence of the diaphragm 12 ensure maintaining the liquid surface on a side of the cathode chamber 22 at a position higher than the liquid surface of the anode chamber 21. The position of the liquid surface depends on the water permeability and the size of the filter cloth as the diaphragm 12. The water permeability of the diaphragm 12 needs to be set within a range where the liquid does not overflow from the cathode chamber 22.

Since the opening 15a of the outlet pipe 15 for taking out the metal dissolved electrolyte is disposed below the anode 13, the metal dissolved electrolyte having a relatively large specific gravity is efficiently taken out.

(Direct-Current Power Supply 17)

The direct-current power supply 17 has a function that can supply a pulse current, not only a function that continuously supplies a direct current of a constant value. "Supplying pulse current" means performing an intermittent current application that repeats a periodic application and interruption of the current by setting the times of current application (ON) and current interruption (OFF) (referred to as pulse current application or pulse electrolysis in some cases).

Figure 2:
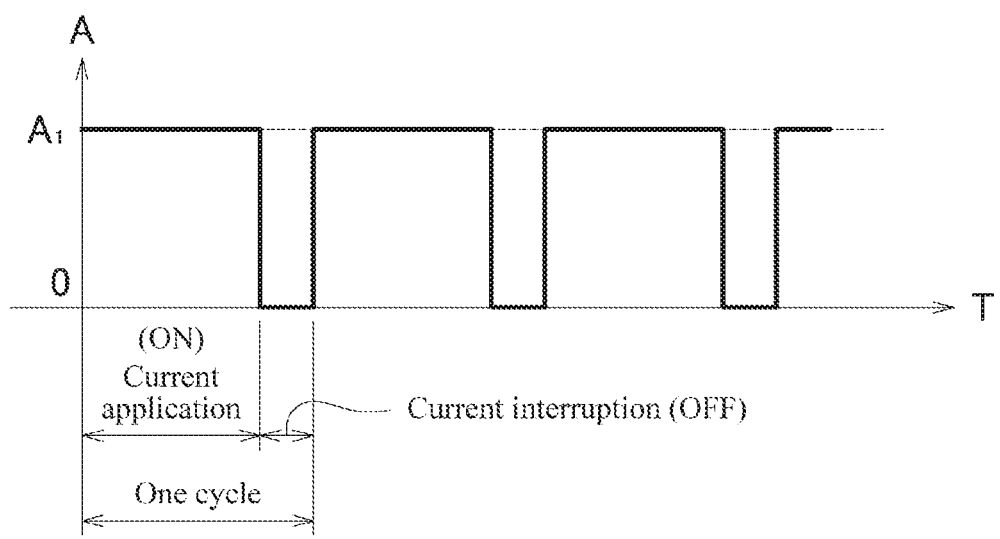
FIG. 2 is an explanatory diagram of a pulse current supplied to the electrolyzer.

FIG. 2 illustrates an exemplary pulse current supplied to the electrolyzer 10. The vertical axis indicates the current value A, and the horizontal axis indicates the time T. As illustrated in FIG. 2, for the pulse current, the current A1 is supplied for a certain period of time, and thereafter, the supply is stopped, and these are repeated. That is, the pulse current is supplied in a rectangular form.

When the metal ion concentration becomes excessively high near the anode 13, the passivation is easily generated. In order to suppress this, the pulse current is supplied. That is, periodically turning the current OFF temporarily stops an elution of the metal ions from the anode 13, and, during this time, the metal ions eluted using a liquid flow in the tank are distanced away from near the anode 13. As a result, the metal ion concentration near the anode 13 can be suppressed from increasing.

Note that a proportion of ON time with respect to a cycle is defined as a duty ratio. The current density when the pulse current application is used is described as an average current density including the ON time and OFF time. For example, in the case where the current density is 1250 A/m$^2$ when it is ON, and the duty ratio is 0.8 (that is, the current is applied for 80% of the time), the average current density is 1250× 0.8=1000 A/m$^2$. Note that the "interruption" of the "application and interruption of current" in claims includes not only completely dropping the current to 0 A, but also includes considerably decreasing the current value with respect to that when it is ON. Note that the case where the duty ratio is 1 means a current application to one simple direction with the proportion of the current supplying time is 100%.

<Method for Manufacturing Sulfuric Acid Solution>
(Initial Electrolyte Supply Step)

In the method for manufacturing the sulfuric acid solution according to the present invention, first, a sulfuric acid solution that contains chloride ions is supplied to the electrolyzer 10 according to the first embodiment as an initial electrolyte (an initial electrolyte supply step). The initial electrolyte is supplied to both the anode chamber 21 and the cathode chamber 22. The initial electrolyte is preferred to have the chloride ion concentration and a sulfuric acid concentration as described below. A position of the liquid surface is set such that the liquid surface in the cathode chamber 22 becomes higher than the liquid surface in the anode chamber 21.

(Chloride Ion Concentration)

When the metallic nickel undergoes an anode dissolution in the sulfuric acid solution without performing any countermeasure, there is easily formed an oxide film, that is, a passivation film on the surface of the anode 13 to cause a state of passivation where the current hardly flows. This formation of the passivation film is said to be reduced by a presence of halogen ions, a decreased hydrogen ion concentration (pH), an increased temperature, and the like. The inventor has examined the anode dissolution of the metallic nickel, and an addition of the chloride ions into the electrolyte was effective in particular. Note that the chloride ion concentration means the chloride ion concentration in the electrolyte after the predetermined chloride is added into the electrolyte.

The chloride ion concentration in the electrolyte is preferred to be 1 g/liter or more and 20 g/liter or less. This is because the formation of the passivation film is appropriately suppressed and, when it is used for a positive electrode of a lithium-ion battery, the chloride ion concentration is preferred to be low. When it is less than 1 g/liter, the effect to suppress the formation of the passivation film is insufficient. In view of this, it is difficult to make the current density 1000 A/m$^2$ or more when a metal electrolysis is performed. The chloride concentration is preferred to be 4 g/liter or more. In performing the anode dissolution of metallic nickel, the concentration can be increased up to where the solubility of the metallic nickel can be ensured.

However, when the metal ion-containing sulfuric acid solution is used for manufacturing a positive electrode of a lithium-ion battery, the chloride ion concentration in the sulfuric acid solution to be obtained is preferred to be low. The chloride ion concentration in this case is preferred to be 20 g/liter or less.

Note that the chloride ion can be supplied in a form of a sodium chloride or a lithium chloride. However, since it is preferred to reduce as many impurities as possible inside the sulfuric acid solution, it is preferred that the chloride ion is added in a form of hydrochloric acid or in a form of a chloride salt having the same ions as the metal ions contained in the sulfuric acid solution, such as nickel chloride.

When the chloride ion concentration in the sulfuric acid solution is 1 g/liter or more and 20 g/liter or less, the current density when the anode electrode is dissolved can be increased, thereby ensuring further efficient manufacturing of the sulfuric acid solution.

Note that, for a range of chloride ion concentration, in the case of the anode dissolution of the metallic nickel, the above-described 1 g/liter or more and 20 g/liter or less is preferred, but same applies to the case of the metal cobalt. However, in the case of the metal cobalt, there are some cases where the dissolution proceeds even though the chloride ion concentration is 0 g/liter.

(Sulfuric Acid Concentration)

A concentration value of the sulfuric acid (also referred to as "free sulfuric acid") supplied as the initial electrolyte is preferred to be as small as possible. This is because when the value of the sulfuric acid concentration is small, a cost for an agent for neutralizing the metal ion-containing sulfuric acid solution taken out from the electrolyzer 10 can be reduced.

However, when the concentration value of the sulfuric acid supplied as the initial electrolyte is decreased, there occur problems of increased liquid resistance due to a lowered electrical conductivity of the electrolyte (also simply referred to as "conductivity") and a high voltage due to a lowered diffusion limiting current value of the hydrogen ions at the cathode 14. It is preferred to set to the most economical condition in consideration of electricity bill and the cost of the neutralization agent. In view of this, using a pH meter, an electric conductivity meter (also simply referred to as a "conductivity meter"), or the like, an amount of current and a supply amount of the sulfuric acid solution supplied to the cathode 14 side is preferred to be adjusted so as to have an appropriate free concentration.

(Electrolyte Taking Out Step)

In the method for manufacturing the sulfuric acid solution according to the present invention, subsequently, a current is supplied to the anode 13 and the cathode 14 disposed in the electrolyzer 10 according to the first embodiment, and a metal dissolved electrolyte in which the metal that constitutes the anode 13 is dissolved is taken out from the anode chamber 21 (an electrolyte taking out step). This metal dissolved electrolyte becomes the sulfuric acid solution when it is taken out from the electrolyzer 10. The metal dissolved electrolyte is preferred to have the metal ion concentration and the electrolyte temperature as described below. Note that the electrolyte taking out step includes a case where the metal dissolved electrolyte is taken out simultaneously with the current supply to the anode 13 and the like, and a case where the metal dissolved electrolyte is taken out after the current supply is terminated.

In the cathode chamber 22, the sulfuric acid is replenished from the supply pipe 16. The liquid surface in the cathode chamber 22 side is set higher than the liquid surface in the anode chamber 21. The position of the liquid surface depends on the water permeability and the size of the filter cloth as the diaphragm 12. The water permeability of the diaphragm 12 needs to be set within a range where the liquid does not overflow from the cathode chamber 22.

Maintaining the liquid surface in the cathode chamber 22 higher than the liquid surface in the anode chamber 21 forms a flow of liquid to the anode chamber 21 from the cathode chamber 22, thereby further inhibiting the metal ions from moving to the cathode chamber 22 from the anode chamber 21.

Since the method for manufacturing the sulfuric acid solution comprises the electrolyte taking out step, that is, a step of supplying the current to the anode 13 and the cathode 14 and taking out the metal dissolved electrolyte from the anode chamber 21, the sulfuric acid solution with a high metal ion concentration is taken out from the anode chamber 21. Therefore, the formation of passivation in the anode 13 side can be suppressed, thereby ensuring an efficient manufacturing of the high-quality sulfuric acid solution in which the metal is dissolved.

(Metal Ion Concentration)

The metal ion concentration in the sulfuric acid solution manufactured in the method for manufacturing the sulfuric acid solution according to the present invention is determined by the usage of the sulfuric acid solution. For example, when the sulfuric acid solution is used as a nickel material used for a positive electrode of a secondary battery, the sulfuric acid solution that contains the high concentration of nickel ion with the nickel ion concentration in the sulfuric acid solution of approximately 90 to 100 g/liter is necessary. The same applies to the case of cobalt.

The metal ion concentration in the sulfuric acid solution is determined by the following parameters. That is, when the anode 13 is metallic nickel, all the reaction at the anode 13 is a dissolution of the nickel, a current value supplied to the anode 13 determines a dissolution amount. In the case of a batch type, an integrated current amount (also referred to as a current amount) supplied to the anode 13 is determined so as to obtain a desired nickel ion concentration. On the other hand, in the case of a continuous type, the sulfuric acid is replenished in the cathode chamber 22 such that the dissolution amount has the desired nickel ion concentration, and the same amount of the metal dissolved electrolyte is taken out from the anode chamber 21 as the sulfuric acid solution.

The metal that constitutes the anode 13 containing at least any one of nickel and cobalt ensures that the manufactured sulfuric acid solution is used as a positive electrode of a secondary battery.

Note that, the sulfuric acid solution supplied to the anode chamber 21 as the initial electrolyte is preferred to be a sulfuric acid solution that has a predetermined nickel ion concentration or more. In this case, the metal dissolved electrolyte has the predetermined nickel ion concentration immediately after the taking out starts, and therefore, the sulfuric acid solution having the predetermined nickel ion concentration can be obtained from the beginning. The sulfuric acid solution supplied to the anode chamber 21 as the initial electrolyte has the nickel ion concentration less than the predetermined nickel ion concentration, the sulfuric acid solution that has not reached the predetermined nickel ion concentration at the beginning when the dissolution starts has no problem if it is returned to the anode chamber 21 side. In order to make the nickel ion concentration uniform in the electrolyte, it is no problem to be configured that the electrolyte in the anode chamber 21 is stirred by a pump or the like.

(Electrolyte Temperature)

The electrolyte temperature in the electrolyzer 10 is preferred to be high. When the electrolyte temperature is high, it is possible to suppress the passivation of the nickel that undergoes the anode dissolution. However, as the electrolyte temperature increases, the costs required for heat resistance of a facility material of the electrolyzer 10 and the like and heating increase, and therefore, it is preferred to set to the most economical condition in consideration of productivity and cost. Taking the heat resistance of polyvinyl chloride, which is an industrially common material, into consideration, the electrolyte temperature is preferred to be a temperature of 65° C. or less, preferably, approximately 50 to 60° C.

(Evaluation of Current Efficiency)

Manufacturing a sulfuric acid solution in accordance with the method for manufacturing the sulfuric acid solution according to the present invention ensures efficiently obtaining the sulfuric acid solution that contains the metal ions in a short time. Current efficiency was calculated approximately how much the current applied at this time contributed to the dissolution of the metal. The current efficiency was obtained in percentage by dividing a value obtained by subtracting a weight increment of the cathode 14 from a weight decrement of the anode 13 by a theoretical dissolution amount obtained from the current amount as described in the following Math. 1. When the current efficiency is 90% or more, it was determined that the electrolysis was efficiently performed.

Current efficiency (%)=(a weight decrement of anode 13–a weight increment of cathode 14)/ theoretical dissolution amount×100    Math. 1

(Others)

In the electrolyzer 10 according to the present invention, electrical conductivity or pH of the solution in the anode 13 side can be measured using a known measuring apparatus so as to be used for management control, such as adjustments of a supply amount of sulfuric acid and a current to be applied.

In examples of the present invention described below, the current application in the electrolysis employs a common method that applies a current without changing polarities of the anode 13 and the cathode 14 in continuous with a nickel plate or a cobalt plate of the anode 13, that is, a one direction current application and an intermittent current application that applies the current repeating a short time power interruption at a certain cycle (also referred to as a "pulse current application"). Meanwhile, a current application method referred to as a PR current application that periodically inverts the polarities of the anode 13 and the cathode 14 at a certain cycle is also employed in some cases. These current application methods have effects to suppress the generation of passivation of the anode 13, and for this, the current density can be increased to improve production efficiency or the chloride concentration to be added can be reduced to make the sulfuric acid solution have further high purity.

EXAMPLES

Example 1

In Example 1, the electrolyzer 10 in which the anode chamber 21 and the cathode chamber 22 were separated by a filter cloth having a water permeability of 0.1 liters/(m²·s) as the diaphragm 12 was used. In the electrolyzer 10, metallic nickel plates were placed as the anode 13 and the cathode 14 with an inter-electrode distance of 45 mm. The respective effective areas were 16 cm².

The following sulfuric acid solution was supplied to the anode chamber 21 as an initial electrolyte such that a height of a liquid surface in the anode chamber 21 reached 120 mm. This initial electrolyte has a nickel ion concentration of 100 g/liter, a free sulfuric acid concentration of 29 g/liter, and a chloride ion concentration of 3 g/liter by dissolving a nickel sulfate crystal in water and adjusting an acid concentration and a chloride concentration with sulfuric acid and hydrochloric acid. Note that the anode 13 had an effective surface with a lower end from which a distance to a bottom of the anode chamber 21 was 30 mm.

The following sulfuric acid solution was supplied to the cathode chamber 22 as an initial electrolyte such that a height of a liquid surface in the cathode chamber 22 became higher than that in the anode chamber 21. This initial electrolyte has a chloride ion concentration in the cathode chamber 22 of 3 g/liter by supplying hydrochloric acid to sulfuric acid with a concentration of 196 g/liter. Conditions before the metal dissolution of Example 1 are shown in Table 1.

A current was supplied to the anode 13 and the cathode 14 disposed in the electrolyzer 10 such that a current density became 2000 A/m². In this respect, the temperature of the electrolyte was controlled to be 60° C. Simultaneously with the supply of the current, in the cathode chamber 22, a total of 0.6 m liters/min of the sulfuric acid having a concentration of 196 g/liter and the hydrochloric acid were supplied to the electrolyzer 10 through the supply pipe 16. An amount of the hydrochloric acid at this time is adjusted to have a chloride ion concentration inside the cathode chamber 22 of 3 g/liter. In addition, the same amount of a metal dissolved electrolyte as the supplied total amount of the sulfuric acid and the hydrochloric acid was taken out from the opening 15a of the outlet pipe 15 located 5 mm above from the bottom of the anode chamber 21.

A result of Example 1 is shown in Table 2. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 98%, and it was found that an electrolysis was efficiently performed. Furthermore, a nickel ion concentration in the cathode chamber 22 was measured to be 6 g/liter, and it was found that the nickel ions were inhibited from moving to the cathode chamber 22.

Example 2

The parameters are the same as those in Example 1 other than that the following sulfuric acid solutions were supplied to the anode chamber 21 and the cathode chamber 22 as initial electrolytes. The initial electrolyte in the anode chamber 21 of Example 2 has a nickel ion concentration of 100 g/liter, a free sulfuric acid concentration of 25 g/liter, and a chloride ion concentration of 6 g/liter by dissolving a nickel sulfate in water and adjusting with sulfuric acid and hydrochloric acid. The initial electrolyte in the cathode chamber 22 has a chloride ion concentration of 6 g/liter by supplying hydrochloric acid in sulfuric acid having a concentration of 192 g/liter. Conditions before the metal dissolution of Example 2 are shown in Table 1.

A result of Example 2 is shown in Table 2. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 98%, and it was found that an electrolysis was efficiently performed. Furthermore, a nickel ion concentration in the cathode chamber 22 was measured to be 5 g/liter, and it was found that the nickel ions were inhibited from moving to the cathode chamber 22.

Example 3

In Example 3, the diaphragm 12 is a filter cloth that has a water permeability of 0.3 liters/(m²·s). The parameters are the same as those in Example 1 other than this. Conditions before the metal dissolution of Example 3 are shown in Table 1.

A result of Example 3 is shown in Table 2. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 96%, and it was found that an electrolysis was efficiently performed. Furthermore, a nickel ion concentration in the cathode chamber 22 was measured to be 11 g/liter, and it was found that the nickel ions were inhibited from moving to the cathode chamber 22.

Example 4

In Example 4, the diaphragm 12 is a filter cloth that has a water permeability of 0.05 liters/(m²·s). The parameters are the same as those in Example 1 other than this. Conditions before the metal dissolution of Example 4 are shown in Table 1.

A result of Example 4 is shown in Table 2. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 98%, and it was found that an electrolysis was efficiently performed. Furthermore, a nickel ion concentration in the cathode chamber 22 was measured to be 4 g/liter, and it was found that the nickel ions were inhibited from moving to the cathode chamber 22.

Example 5

In Example 5, a distance from the lower end of the effective surface of the anode 13 to the bottom of the anode chamber 21 is 20 mm. The parameters are the same as those in Example 1 other than this. Conditions before the metal dissolution of Example 5 are shown in Table 1.

A result of Example 5 is shown in Table 2. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 98%, and it was found that an electrolysis was efficiently performed. Furthermore, a nickel ion concentration in the cathode chamber 22 was measured to be 7 g/liter, and it was found that the nickel ions were inhibited from moving to the cathode chamber 22.

Example 6

In Example 6, a distance from the lower end of the effective surface of the anode 13 to the bottom of the anode chamber 21 is 10 mm. The parameters are the same as those in Example 1 other than this. Conditions before the metal dissolution of Example 6 are shown in Table 1.

A result of Example 6 is shown in Table 2. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, even though there was a phenomenon of unstable voltage at the beginning of the current application, the current efficiency with respect to an application of current of 21 Ah was confirmed to be 98%, and it was found that an electrolysis was efficiently performed. Furthermore, a nickel ion concentration in the cathode chamber 22 was measured to be 8 g/liter, and it was found that the nickel ions were inhibited from moving to the cathode chamber 22.

Example 7

In Example 7, the parameters are the same as those in Example 1 other than that a metal cobalt plate was employed as the anode 13 and the cathode 14, that the following sulfuric acid solutions were supplied to the anode chamber 21 and the cathode chamber 22 as initial electrolytes, or that a concentration of sulfuric acid supplied to the cathode chamber 22 was 196 g/liter. The initial electrolyte in the anode chamber 21 of Example 7 has a cobalt ion concentration of 100 g/liter, a free sulfuric acid concentration of 29 g/liter, and a chloride ion concentration of 3 g/liter by dissolving a cobalt sulfate in water and adjusting with sulfuric acid and hydrochloric acid. The initial electrolyte in the cathode chamber 22 has a chloride ion concentration of 3 g/liter by supplying hydrochloric acid in sulfuric acid having a concentration of 196 g/liter.

A result of Example 7 is shown in Table 2. The taken out metal dissolved electrolyte had a cobalt ion concentration of 100 g/liter, which was a cobalt ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 98%, and it was found that an electrolysis was efficiently performed. Furthermore, a cobalt ion concentration in the cathode chamber 22 was measured to be 4 g/liter, and it was found that the cobalt ions were inhibited from moving to the cathode chamber 22.

Comparative Example 1

In Comparative Example 1, the following initial electrolytes were supplied to the anode chamber 21 and the cathode chamber 22. The initial electrolyte in the anode chamber 21 has a nickel ion concentration of 100 g/liter, a free sulfuric acid concentration of 32 g/liter, and a chloride ion concentration of 0.6 g/liter by dissolving a nickel sulfate in water and adjusting with sulfuric acid and hydrochloric acid. The initial electrolyte in the cathode chamber 22 has a chloride ion concentration of 0.6 g/liter by supplying hydrochloric acid to sulfuric acid having a concentration of 199 g/liter. The parameters are the same as those in Example 1 other than this. Conditions before the metal dissolution of Comparative Example 1 are shown in Table 1.

A result of Comparative Example 1 is shown in Table 2. In Comparative Example 1, when the current density has increased up to 800 A/m after the current started to flow, a voltage was rapidly increased to generate oxygen from the anode 13, and therefore, the dissolution was cancelled. That is, with the conditions of Comparative Example 1, the current density failed to be increased, thereby failing to efficiently obtain a sulfuric acid solution.

Comparative Example 2

In Comparative Example 2, the diaphragm 12 is a filter cloth that has a water permeability of 1 liters/(m$^2$·s). The parameters are the same as those in Example 1 other than this. Conditions before the metal dissolution of Comparative Example 2 are shown in Table 1.

A result of Comparative Example 2 is shown in Table 2. The taken out metal dissolved electrolyte had a nickel ion concentration of 70 g/liter, and was an insufficient nickel ion concentration for being used for manufacturing a positive electrode of a lithium-ion battery. The current efficiency with respect to an application of current of 21 Ah was confirmed to be 77%, and it was found that the supply of current failed to sufficiently contribute to the dissolution of the metal. Furthermore, the nickel ion concentration in the cathode chamber 22 was measured to be 40 g/liter, and was found to be insufficient to inhibit the nickel ions from moving to the cathode chamber 22.

Comparative Example 3

In Comparative Example 3, the electrolyzer 10 without the diaphragm 12 was used. A supplied initial electrolyte at this time was the following. This initial electrolyte has a nickel ion concentration of 100 g/liter, a free sulfuric acid concentration of 29 g/liter, and a chloride ion concentration of 3 g/liter by dissolving a nickel sulfate in water and adjusting with sulfuric acid and hydrochloric acid. The parameters are the same as those in Example 1 other than this. Conditions before the metal dissolution of Comparative Example 3 are shown in Table 1.

A result of Comparative Example 3 is shown in Table 2. Sometime after the current application, the anode 13 and the cathode 14 were short-circuited. The cathode 14 was taken out and it was confirmed that the nickel was deposited in a dendrite shape. That is, it was found that it was difficult to efficiently obtain a sulfuric acid solution.

Comparative Example 4

In Comparative Example 4, the diaphragm 12 is a filter cloth that has a water permeability of 1 liters/(m$^2$·s). The parameters are the same as those in Example 7 other than this. Conditions before the metal dissolution of Comparative Example 4 are shown in Table 1.

A result of Comparative Example 4 is shown in Table 2. The taken out metal dissolved electrolyte had a cobalt ion concentration of 70 g/liter, and was a cobalt ion concentration insufficient for being used for manufacturing a positive electrode of a lithium-ion battery. The current efficiency with respect to an application of current of 21 Ah was confirmed to be 76%, and it was found that the supply of current failed to sufficiently contribute to the dissolution of metal. Furthermore, the cobalt ion concentration in the cathode chamber 22 was measured to be 41 g/liter, and was found to be insufficient to inhibit the cobalt ions from moving to the cathode chamber 22.

Comparative Example 5

In Comparative Example 5, the electrolyzer 10 without the diaphragm 12 was used. A supplied initial electrolyte at this time was the following. This initial electrolyte has a cobalt ion concentration of 100 g/liter, a free sulfuric acid concentration of 33 g/liter, and a chloride ion concentration of 0 g/liter by dissolving a cobalt sulfate in water and adjusting with sulfuric acid and hydrochloric acid. The parameters are the same as those in Example 7 other than this. Conditions before the metal dissolution of Comparative Example 5 are shown in Table 1.

A result of Comparative Example 5 is shown in Table 2. Sometime after the current application, the anode 13 and the cathode 14 were short-circuited. The cathode 14 was taken out and it was confirmed that the cobalt was deposited in a dendrite shape. That is, it was found that it was difficult to efficiently obtain a sulfuric acid solution.

TABLE 1

| | Diaphragm | Electrode | Water permeability $1/(m^2 \cdot S)$ | Lower portion of electrode from bottom of anode chamber mm | Before dissolution | | | |
|---|---|---|---|---|---|---|---|---|
| | | | | | Anode chamber sulfuric acid concentration g/l | Anode chamber Cl- concentration g/l | Cathode chamber sulfuric acid concentration g/l | Cathode chamber Cl- concentration g/l |
| Example 1 | Filter cloth | Ni | 0.1 | 30 | 29 | 3 | 196 | 3 |
| Example 2 | Filter cloth | Ni | 0.1 | 30 | 25 | 6 | 192 | 6 |
| Example 3 | Filter cloth | Ni | 0.3 | 30 | 29 | 3 | 196 | 3 |
| Example 4 | Filter cloth | Ni | 0.05 | 30 | 29 | 3 | 196 | 3 |
| Example 5 | Filter cloth | Ni | 0.1 | 20 | | 3 | 196 | 3 |
| Example 6 | Filter cloth | Ni | 0.1 | 10 | 29 | 3 | 196 | 3 |
| Example 7 | Filter cloth | Co | 0.1 | 30 | 29 | 3 | 196 | 3 |
| Comparative Example 1 | Filter cloth | Ni | 0.1 | 30 | 32 | 0.6 | 199 | 0.6 |
| Comparative Example 2 | Filter cloth | Ni | 1 | 30 | 29 | 3 | 196 | 3 |
| Comparative Example 3 | None | Ni | — | 30 | 29 | 3 | 196 | 3 |
| Comparative Example 4 | Filter cloth | Co | 1 | 30 | 29 | 3 | 196 | 3 |
| Comparative Example 5 | None | Co | — | 30 | 33 | 0 | 200 | 0 |

TABLE 2

| | After dissolution | | | | |
|---|---|---|---|---|---|
| | Current amount Ah | Taken out electrolyte Ni or Co concentration g/l | Cathode chamber Ni or Co concentration g/l | Current efficiency % | Determination |
| Example 1 | 21 | 100 | 6 | 98 | Pass |
| Example 2 | 21 | 100 | 5 | 98 | Pass |
| Example 3 | 21 | 100 | 11 | 96 | Pass |
| Example 4 | 21 | 100 | 4 | 98 | Pass |
| Example 5 | 21 | 100 | 7 | 98 | Pass |
| Example 6 | 21 | 100 | 8 | 98 | Pass |
| Example 7 | 21 | 100 | 4 | 98 | Pass |
| Comparative Example 1 | Cancelled due to oxygen generation from anode | | | | Fail |
| Comparative Example 2 | 21 | 70 | 40 | 77 | Fail |
| Comparative Example 3 | Cancelled due to short circuit | | | | Fail |
| Comparative Example 4 | 21 | 70 | 41 | 76 | Fail |
| Comparative Example 5 | Cancelled due to short circuit | | | | Fail |

Example 8

The parameters are the same as those in Example 1 other than that a pulse current that repeats a periodic application and interruption of the current was supplied to the anode 13 and the cathode 14 disposed in the electrolyzer 10, or that the following sulfuric acid solutions were supplied to the anode chamber 21 and the cathode chamber 22 as initial electrolytes. In Example 8, the pulse current was supplied so as to have a cycle of one second, an ON time of 0.85 seconds, a duty ratio of 0.85, and an average current density of 1000 A/m$^2$. The initial electrolyte in the anode chamber 21 of Example 8 has a nickel ion concentration of 100 g/liter, a free sulfuric acid concentration of 32 g/liter, and a chloride ion concentration of 1 g/liter by dissolving a nickel sulfate in water and adjusting with sulfuric acid and hydrochloric acid. The initial electrolyte in the cathode chamber 22 has a chloride ion concentration of 1 g/liter by supplying hydrochloric acid to sulfuric acid having a concentration of 199 g/liter. Conditions before the metal dissolution of Example 8 is shown in Table 3.

A result of Example 8 is shown in Table 4. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 98%, and it was found that an electrolysis was efficiently performed. Furthermore, a nickel ion concentration in the cathode chamber 22 was measured to be 7 g/liter, and it was found that the nickel ions were inhibited from moving to the cathode chamber 22.

Example 9

The parameters are the same as those in Example 8 other than that a pulse current that repeats a periodic application and interruption of the current was supplied to the anode 13 and the cathode 14 disposed in the electrolyzer 10, that the anode 13 and the cathode 14 had different electrode effective areas, or that the following sulfuric acid solutions were supplied to the anode chamber 21 and the cathode chamber 22 as initial electrolytes. In Example 9, the effective areas of the anode 13 and the cathode 14 disposed in the electrolyzer 10 were 20 cm². The pulse current was supplied so as to have a cycle of two seconds, an ON time of 1.9 seconds, a duty ratio of 0.95, and an average current density of 1600 A/m². In addition, the initial electrolyte in the anode chamber 21 of Example 9 has a nickel ion concentration of 100 g/liter, a free sulfuric acid concentration of 30 g/liter, and a chloride ion concentration of 2 g/liter by dissolving a nickel sulfate in water and adjusting with sulfuric acid and hydrochloric acid. The initial electrolyte in the cathode chamber 22 has a chloride ion concentration of 2 g/liter by supplying hydrochloric acid to sulfuric acid having a concentration of 197 g/liter. Conditions before the metal dissolution of Example 9 is shown in Table 3.

A result of Example 9 is shown in Table 4. The taken out metal dissolved electrolyte had a nickel ion concentration of 100 g/liter, which was a nickel ion concentration sufficient for being used in manufacturing a positive electrode of a battery. The current density was also sufficiently high, and a sulfuric acid solution was efficiently obtained. In addition, the current efficiency with respect to an application of current of 21 Ah was confirmed to be 98%, and it was found that an electrolysis was efficiently performed. Furthermore, a nickel ion concentration in the cathode chamber 22 was measured to be 5 g/liter, and it was found that the nickel ions were inhibited from moving to the cathode chamber 22.

Comparative Example 6

The parameters are the same as those in Example 8 other than that the following sulfuric acid solutions were supplied to the anode chamber 21 and the cathode chamber 22 as initial electrolytes. The initial electrolyte in the anode chamber 21 of Comparative Example 6 has a nickel ion concentration of 100 g/liter, a free sulfuric acid concentration of 32 g/liter, and a chloride ion concentration of 0.5 g/liter by dissolving a nickel sulfate in water and adjusting sulfuric acid and hydrochloric acid. The initial electrolyte in the cathode chamber 22 has a chloride ion concentration of 0.5 g/liter by supplying hydrochloric acid to sulfuric acid having a concentration of 199 g/liter. Conditions before the metal dissolution of Comparative Example 6 is shown in Table 3.

A result of Comparative Example 6 is shown in Table 4. In Comparative Example 6, when the current density has increased up to 800 A/m² after the current started to flow, a voltage was rapidly increased to generate oxygen from the anode 13, and therefore, the dissolution was cancelled. That is, with the conditions of Comparative Example 6, the current density failed to be increased, thereby failing to efficiently obtain a sulfuric acid solution.

Comparative Example 7

The parameters are the same as those in Example 8 other than that a pulse current different from that in Example 8 was supplied to the anode 13 and the cathode 14 disposed in the electrolyzer 10. In the Comparative Example 7, the pulse current was supplied so as to have a cycle of one second, an ON time of 0.5 seconds, and a duty ratio of 0.5. Conditions before the metal dissolution of Comparative Example 7 is shown in Table 3.

A result of Comparative Example 7 is shown in Table 4. Sometime after the current application, a voltage was rapidly increased to generate oxygen from the anode 13, and therefore, the dissolution was cancelled. That is, it was found difficult to efficiently obtain a sulfuric acid solution.

TABLE 3

| | | | | Pulse Current | | | Before dissolution | | | |
| | | | | | | | Anode chamber | Anode Chamber | Cathode chamber | Cathode Chamber |
| | Diaphragm | Average density current A/m² | Electrode area effective m² | Cycle S | ON time S | Duty ratio | sulfuric acid concentration g/l | Cl- concentrate g/l | sulfuric acid concentration g/l | Cl- concentrate g/l |
| --- | --- | --- | --- | --- | --- | --- | --- | --- | --- | --- |
| Example 8 | Filter cloth | 1000 | 16 | 1 | 0.85 | 0.85 | 32 | 1 | 199 | 1 |
| Example 9 | Filter cloth | 1600 | 20 | 2 | 1.9 | 0.95 | 30 | 2 | 197 | 2 |
| Comparative Example 6 | Filter cloth | 1000 | 15 | 1 | 0.85 | 0.85 | 32 | 0.5 | 199 | 0.5 |
| Comparative Example 7 | Filter cloth | 1000 | 16 | 1 | 0.5 | 0.5 | 32 | 1 | 199 | 1 |

TABLE 4

| | After dissolution | | | |
| | Current amount Ah | Taken out electrolyte Ni or Co concentration g/l | Cathode chamber Ni or Co concentration g/l | Current efficiency % | Determination |
| --- | --- | --- | --- | --- | --- |
| Example 8 | 21 | 100 | 6 | 98 | Pass |
| Example 9 | 21 | 100 | 5 | 98 | Pass |
| Comparative Example 6 | Cancelled due to oxygen generation from anode | | | | Fail |

TABLE 4-continued

| | After dissolution | | | |
|---|---|---|---|---|
| Current amount Ah | Taken out electrolyte Ni or Co concentration g/l | Cathode chamber Ni or Co concentration g/l | Current efficiency % | Determination |
| Comparative Example 7 | Cancelled due to oxygen generation from anode | | | Fail |

DESCRIPTION OF REFERENCE SIGNS

10 Electrolyzer
12 Diaphragm
13 Anode
14 Cathode
15 Outlet pipe
15a Opening
17 Direct-current power supply
21 Anode chamber
22 Cathode chamber

The invention claimed is:

1. A method for manufacturing a sulfuric acid solution, comprising:
    supplying a chloride ion-containing sulfuric acid solution as an initial electrolyte in an electrolyzer inside of which is divided into an anode chamber and a cathode chamber by a diaphragm; and
    supplying a current to an anode and a cathode disposed in the electrolyzer and subsequently supplying sulfuric acid to the cathode chamber, and taking out a metal dissolved electrolyte in which a metal constituting the anode is dissolved from the anode chamber, wherein
    the diaphragm includes a filter cloth having a water permeability of 0.01 liters/(m²·s) or more and 0.5 liters/(m²·s) or less.

2. The method for manufacturing a sulfuric acid solution according to claim 1, wherein
    the metal constituting the anode contains at least any one of nickel and cobalt.

3. The method for manufacturing a sulfuric acid solution according to claim 1, wherein
    the chloride ion-containing sulfuric acid solution has a chloride ion concentration of 1 g/liter or more and 20 g/liter or less.

4. The method for manufacturing a sulfuric acid solution according to claim 1, wherein
    the cathode chamber has a liquid surface maintained to be higher than a liquid surface of the anode chamber.

5. The method for manufacturing a sulfuric acid solution according to claim 1, wherein
    the taking out includes supplying the anode and the cathode with a pulse current that repeats a periodic application and interruption of the current.

6. The method for manufacturing a sulfuric acid solution according to claim 5, wherein
    in the periodic application and interruption of the current, a proportion of a current application time in one cycle of the periodic application and interruption of the current is 0.8 or more and less than 1.0.

* * * * *